No. 750,680. PATENTED JAN. 26, 1904.
G. F. McADAMS.
RINGED ROLLER FOR LINE PRINTING AND RULING MACHINES.
APPLICATION FILED JAN. 30, 1903.
NO MODEL.

Witnesses:
George Burry Jr
Henry Thieme

Inventor:
George F. McAdams
by attorney

No. 750,680. Patented January 26, 1904.

UNITED STATES PATENT OFFICE.

GEORGE F. McADAMS, OF NEW YORK, N. Y.

RINGED ROLLER FOR LINE-PRINTING AND RULING MACHINES.

SPECIFICATION forming part of Letters Patent No. 750,680, dated January 26, 1904.

Application filed January 30, 1903. Serial No. 141,120. (No model.)

*To all whom it may concern:*

Be it known that I, GEORGE F. McADAMS, a citizen of the United States, and a resident of the borough of Brooklyn, in the city and State of New York, have invented a new and useful Improvement in Ringed Rollers for Line-Printing and Ruling Machines, of which the following is a specification.

This invention is more especially designed for the impression-rollers of line-printing machines and for the foundation-rollers of pen-ruling machines.

The object of this invention is to provide a roller in which the grooves may be quickly adjusted to suit different ruling for line-printing and pen-ruling machines.

A further object is to provide a grooved roller comprising a shaft and rings sprung thereon out of their normal circular shape, the periphery of the rings being trued concentric with the axis of the shaft, which rings are provided with means for locating them in their proper rotary position with respect to the shaft, so that they may be removed and replaced at pleasure after they have been trued.

A further object is to provide a roller in which the rings may be spaced apart at predetermined distances to suit different rulings and to permit the rings on the line-printing roller to be arranged successively opposite the grooves in the first-named rings and the spaces between the said rings.

A practical embodiment of my invention is represented in the accompanying drawings, in which—

Figure 1:
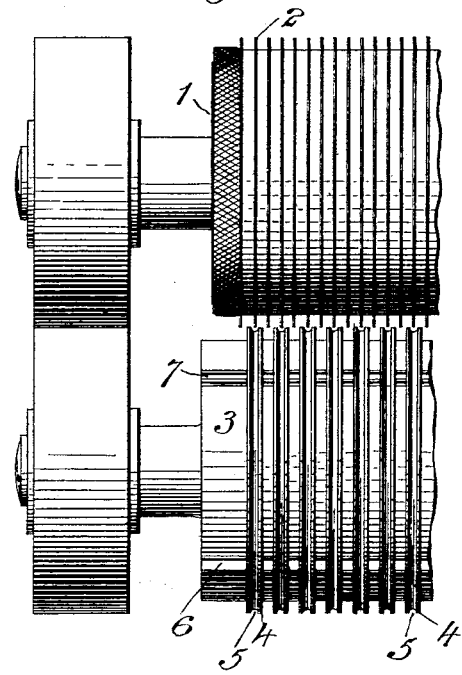
Figure 2:
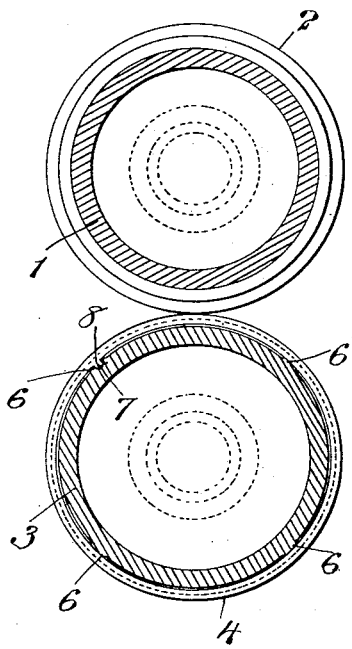
Figure 3:
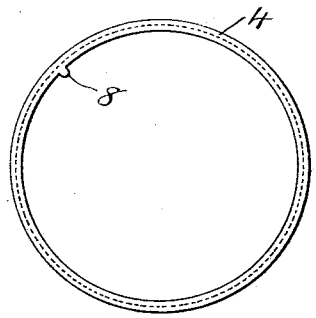
Figure 4:
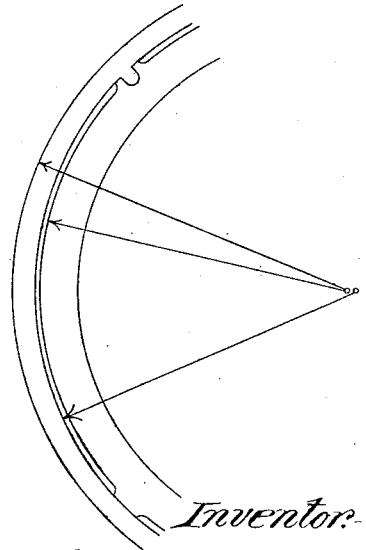

Figure 1 represents a partial longitudinal elevation of a printing-roller and the corresponding impression-roller of a line-printing machine. Fig. 2 is a transverse section through the printing and impression rollers. Fig. 3 is a side elevation of one of the rings, and Fig. 4 is a diagrammatic view showing the method of truing the periphery of the ring to make it concentric with the center of the shaft irrespective of the distorted condition of the inner wall of the ring owing to its being sprung over the ribs upon the shaft.

The printing-roller is denoted by 1, and it may have its line-printing rings 2 applied in any suitable manner—such, for instance, as according to my Letters Patent No. 570,226, dated October 27, 1896.

The shaft of the impression or foundation roller is denoted by 3, which shaft may be made hollow, as shown, to decrease its weight and may be made of any desired shape and size. The rings of the roller are denoted by 4, in the periphery of which rings are formed circumferential grooves 5. These rings are sprung on the shaft 3 out of their normal circular shape. In the present instance the means which I have shown for springing the rings on the shaft are ribs or lugs 6, formed on the shaft and engaging the inner walls of the rings. The distortion of the rings is caused because the diameter of each of the rings is at all points less than the diametric distance across the shaft from the outer face of one rib to the outer face of its corresponding rib upon the opposite side of the shaft. After all of the rings have been forced into their positions along the shaft they will be distorted, as above set forth, and the periphery of the rings may be trued down to make them concentric with the center of the shaft, as shown clearly by the two arrows in Fig. 4, which run to the same center, while the inner walls of the rings remain flattened or distorted between the ribs or lugs, as indicated by the single arrow in Fig. 4. To insure the replacing of the rings in their proper rotary positions with respect to the shaft when the rings have been removed therefrom, I provide a tongue-and-groove connection between the rings and the shaft, as follows: A longitudinal groove 7 is formed in the shaft 3, in the present instance in the face of one of the ribs or lugs 6, and each one of the rings is provided with a tongue 8, projecting inwardly from the inner wall of the ring, which tongue loosely fits within the groove 7. Because the rings are sprung on the shaft they are caused to have such a tight fit thereon as to obviate the necessity of using spacing-collars between the rings and at the same time permit the ruling of lines much closer together than where the rings are mounted upon the shaft in engagement with each other, as by the present arrangement the ruling-disks may be located opposite the spaces between the rings as well as opposite the grooves in the rings. The rings may be made of any suitable metal—such, for instance, as brass—and, as hereinabove explained, may be removed and again mounted upon the shaft at pleasure after having once been trued with respect to the axis of the shaft.

What I claim is—

1. A roller comprising a shaft and rings removably sprung onto the shaft out of their normal circular shape, the peripheries of the rings being afterward trued concentric with the axis of the shaft.

2. A roller comprising a shaft, rings removably mounted thereon and interposed longitudinal ribs or lugs serving to spring the rings out of their normal circular shape, the peripheries of the rings being afterward trued concentric with the axis of the shaft.

3. A roller comprising a shaft, rings removably mounted thereon and longitudinal ribs or lugs on the shaft serving to spring the rings out of their normal circular shape, the peripheries of the rings being afterward trued concentric with the axis of the shaft.

4. A roller comprising a shaft, rings removably sprung onto the shaft out of their normal circular shape, the peripheries of the rings being afterward trued concentric with the axis of the shaft and means for locating the rings in their proper rotary positions with respect to the shaft.

5. A roller comprising a shaft, rings removably sprung onto the shaft out of their normal circular shape, the peripheries of the rings being afterward trued concentric with the axis of the shaft and means for locating the rings in their proper rotary positions with respect to the shaft comprising a groove in the shaft and tongues projecting inwardly from the rings into the said groove.

6. The combination with a printing-roller having line-printing rings thereon, of an impression or foundation roller comprising a shaft and circumferentially-grooved rings mounted on the shaft and spaced apart whereby the rings on the line-printing roller are arranged successively opposite the grooves in the foundation-roller rings and the spaces between the said rings, substantially as set forth.

In testimony that I claim the foregoing as my invention I have signed my name, in presence of two witnesses, this 3d day of December, 1902.

GEORGE F. McADAMS.

Witnesses:
    FREDK. HAYNES,
    GEORGE BARRY, Jr.